(12) United States Patent
Koo

(10) Patent No.: US 8,321,811 B2
(45) Date of Patent: Nov. 27, 2012

(54) METHOD AND APPARATUS FOR CONTROLLING MULTI-TASKING OPERATION FOR TERMINAL DEVICE PROVIDED WITH TOUCH SCREEN

(75) Inventor: Yoon-Hee Koo, Sacheon-si (KR)

(73) Assignee: LG Electronics Inc., Seoul (KR)

( * ) Notice: Subject to any disclaimer, the term of this patent is extended or adjusted under 35 U.S.C. 154(b) by 807 days.

(21) Appl. No.: 12/260,776

(22) Filed: Oct. 29, 2008

(65) Prior Publication Data

US 2009/0113355 A1    Apr. 30, 2009

(30) Foreign Application Priority Data

Oct. 30, 2007    (KR) .................. 10-2007-0109484

(51) Int. Cl.
*G06F 13/00* (2006.01)
*G06F 15/00* (2006.01)

(52) U.S. Cl. ....................................... 715/837; 715/763
(58) Field of Classification Search .......... 715/553–855, 715/864, 761–764, 740; 345/173, 156
See application file for complete search history.

(56) References Cited

U.S. PATENT DOCUMENTS

| | | | |
|---|---|---|---|
| 6,407,325 B2 | 6/2002 | Yi et al. | |
| 7,509,588 B2 * | 3/2009 | Van Os et al. | 715/835 |
| 2010/0275163 A1 * | 10/2010 | Gillespie et al. | 715/810 |

* cited by examiner

*Primary Examiner* — Cao "Kevin" Nguyen
(74) *Attorney, Agent, or Firm* — Birch, Stewart, Kolasch & Birch, LLP

(57) ABSTRACT

A method of controlling a terminal device, and which includes executing a first function on the terminal device, displaying at least one function icon for executing at least one second function that is different than the first function being executed, and selectively executing the second function simultaneously with the first function when said at least one function icon is selected.

18 Claims, 10 Drawing Sheets

(a)

Music function Icon (b)

Radio function Icon (a)

(b)

METHOD AND APPARATUS FOR CONTROLLING MULTI-TASKING OPERATION FOR TERMINAL DEVICE PROVIDED WITH TOUCH SCREEN

CROSS REFERENCE TO RELATED APPLICATIONS

The present application is related to, and claims priority to, Korean patent application No. 10-2007-0109484, filed in Korea on Oct. 30, 2007, the entire contents of which are hereby incorporated by reference.

BACKGROUND OF THE INVENTION

1. Field of the Invention

The present invention relates to a terminal device and corresponding method for providing multi-tasking operations on the terminal.

2. Description of the Related Art

Terminal devices now provide many additional services beside the basic call service. For example, user's can now access the Internet, play games, watch videos, listen to music, capture images and videos, record audio files, etc. Terminals also now provide broadcasting programs such that user can watch television shows, sporting programs, videos etc.

Thus, users can now perform multiple operations on the terminal. However, the operations are generally performed in a simple manner, and is difficult for a user to perform multiple functions on the terminal. This is somewhat inconvenient to the user of the mobile terminal, especially when they want to perform multiple operations simultaneously.

SUMMARY OF THE INVENTION

Accordingly, one object of the present invention is to address the above-noted and other drawbacks.

Another object of the present invention is to provide a terminal device and corresponding method for allowing a user to perform multiple tasks simultaneously.

To achieve these and other advantages and in accordance with the object of the present invention, as embodied and broadly described herein, the present invention provides in one aspect a method of controlling a terminal device, and which includes executing a first function on the terminal device, displaying at least one function icon for executing at least one second function that is different than the first function being executed, and selectively executing the second function simultaneously with the first function when said at least one function icon is selected.

In another aspect, the present invention provides a terminal device including a control unit configured to execute a first function on the terminal device, and a display unit configured to display at least one function icon for executing at least one second function that is different than the first function being executed. Further, the control unit is further configured to selectively execute the second function simultaneously with the first function when said at least one function icon is selected.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Reference will now be made in detail to the preferred embodiments of the present invention, examples of which are illustrated in the accompanying drawings.

In the present description, the term "multi-tasking" means that a plurality of tasks, games, etc. can be performed at the same time on the terminal. For example, the user can listen to music via a MP3 function provided on their terminal while performing another operation such as writing or viewing text on the terminal.

Figure 1:
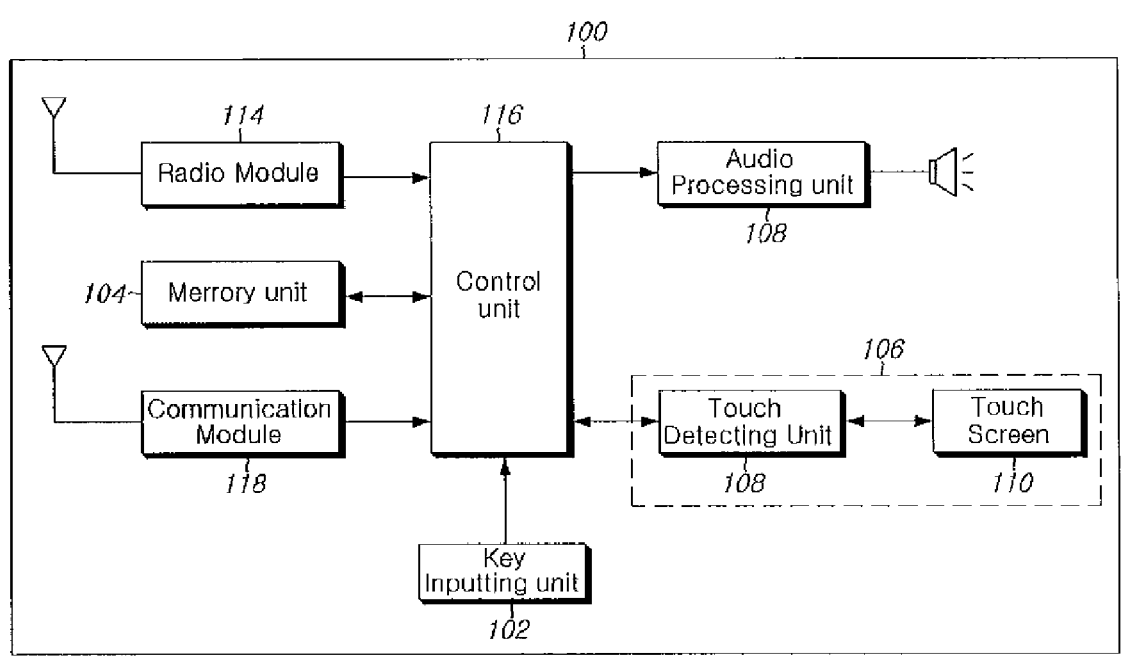
FIG. 1 is a block diagram illustrating a terminal device including a touch screen according to an embodiment of the present invention.

In more detail, FIG. 1 is a block diagram illustrating a terminal device 100 according to an embodiment of the present invention. As shown in FIG. 1, the terminal device 100 includes a key inputting unit 102 including at least one key such as a power on/off button, a hold button, a volume key, a play button, and a selection button. Thus, a user can use the key inputting unit 102 to input information or commands into the terminal 100.

The terminal device 100 also includes a display unit 106 including a touch screen 110 and a touch detecting unit 108. The touch screen 110 is configured to receive touch inputs from a user and the detecting unit 108 detects positions on the touch screen 110 that the user touches. For example, the touch screen 110 can include a plurality of icons corresponding to different functions or control operations on the terminal, and thus the user can touch one of the corresponding icons to begin executing a particular function associated with the touched icon.

The terminal device 100 also includes a memory unit 104 for storing images corresponding to the function and control icons, music files, text, image files, and other data used in operation of the terminal device 100. Further, an audio processing unit 108 is also included for outputting audio signals corresponding to the music files stored in the memory unit 104, for example.

The terminal device 100 also includes a radio module 114 for receiving radio broadcast signals, decoding the received signals and outputting corresponding audio data. In addition, a communication module 118 is provided to the terminal device 100 for transmitting and receiving call requests such that the terminal can perform call functions to other users and terminals. Also included is a control unit 116 for controlling the overall operations of the terminal device 100.

For example, the control unit 116 controls the display unit 106 to display at least one function icon for executing a function different than a currently executing function, and to display at least one control icon corresponding to a function of the selected function icon. The control unit 116 also determines whether a second function can be simultaneously executed with a first function, when the user selects a second function while a first function is currently executing. Then, if the first and second functions can be simultaneously executed, the control unit 116 executes the second function while continuing the execution of the first function. Therefore, the user can perform multiple tasks on the terminal device 100. However, if the control unit 116 determines the first and second functions can not be simultaneously executed, the control unit 116 can pause the first function while the second function is executed. In addition, when a call request is received while executing the first function, the control unit 116 can pause the first function to allow the call to be connected.

Figure 2:
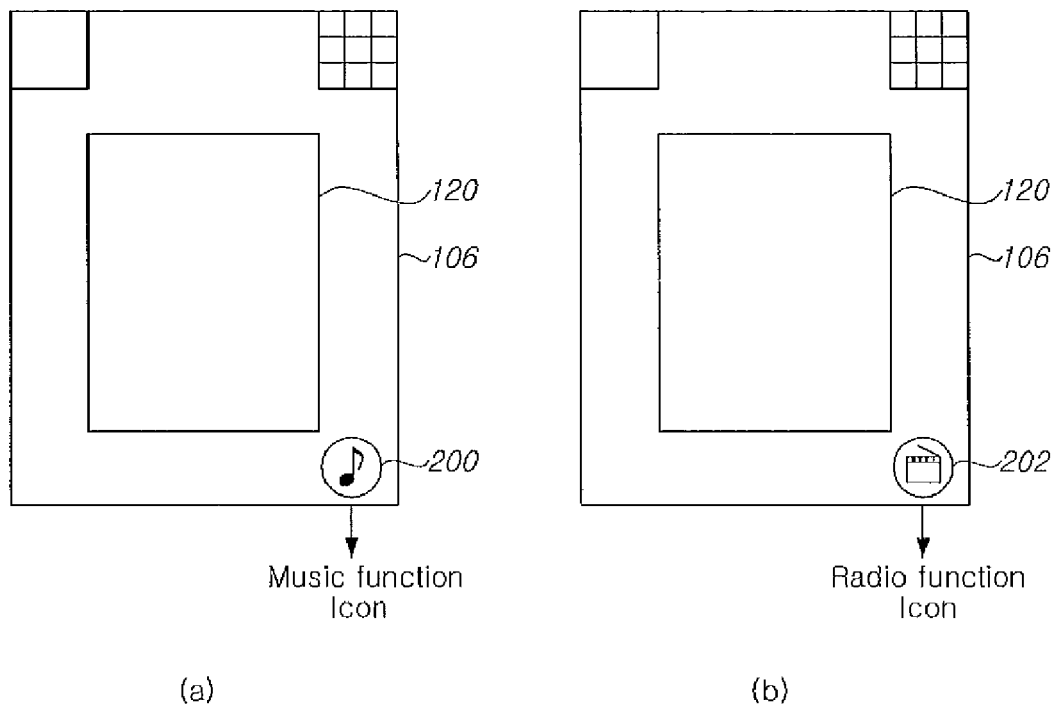
FIGS. 2(a) and 2(b) are overviews of display screens respectively illustrating a music function or a radio function being available for selection while a picture function or a text function is being executed on the terminal according to an embodiment of the present invention.

Next, FIGS. 2(*a*) and 2(*b*) are overviews of display screens respectively illustrating a music function or a radio function being available for selection while a picture function or a text function is being executed on the terminal according to an embodiment of the present invention. As shown in FIG. 2(*a*), the control unit 116 controls the display unit 106 to display a music function icon 200 while a text or picture function 200 in being executed and displayed on the display unit 106. In this example, the menu function icon 200 is displayed at a lower right hand corner of the display unit 106. However, this is an example only, and the menu function icon 200 can be displayed at other portions of the display unit 106.

Therefore, in the example shown in FIG. 2(*a*), the user can touch the music function icon 200 to listen to music while they are continuing to view or work with the text or picture function 120 being executed on the terminal device 100. In addition, FIG. 2(*b*) is similar to FIG. 2(*a*), but illustrates the control unit 116 controlling the display unit 106 to display a radio function icon 202. Thus, in the example shown in FIG. 2(*b*), the user can touch the radio function icon 202 to listen to music while they are continuing to view or work with the text or picture function 120 being executed on the terminal device 100.

In addition, according to one embodiment of the present invention, the user can toggle between the music function icon 200 and the radio function icon 202 by performing a predetermined touch operation. For example, the displayed function icons 200 and 202 can be toggled if the user touches one of the icons continuously for a predetermined amount of time, performs a double touch operation, etc. Other type of input toggling methods may also be preformed. For example, the user can press a hard key to toggle between the displayed icons 200 and 202.

Figure 3:
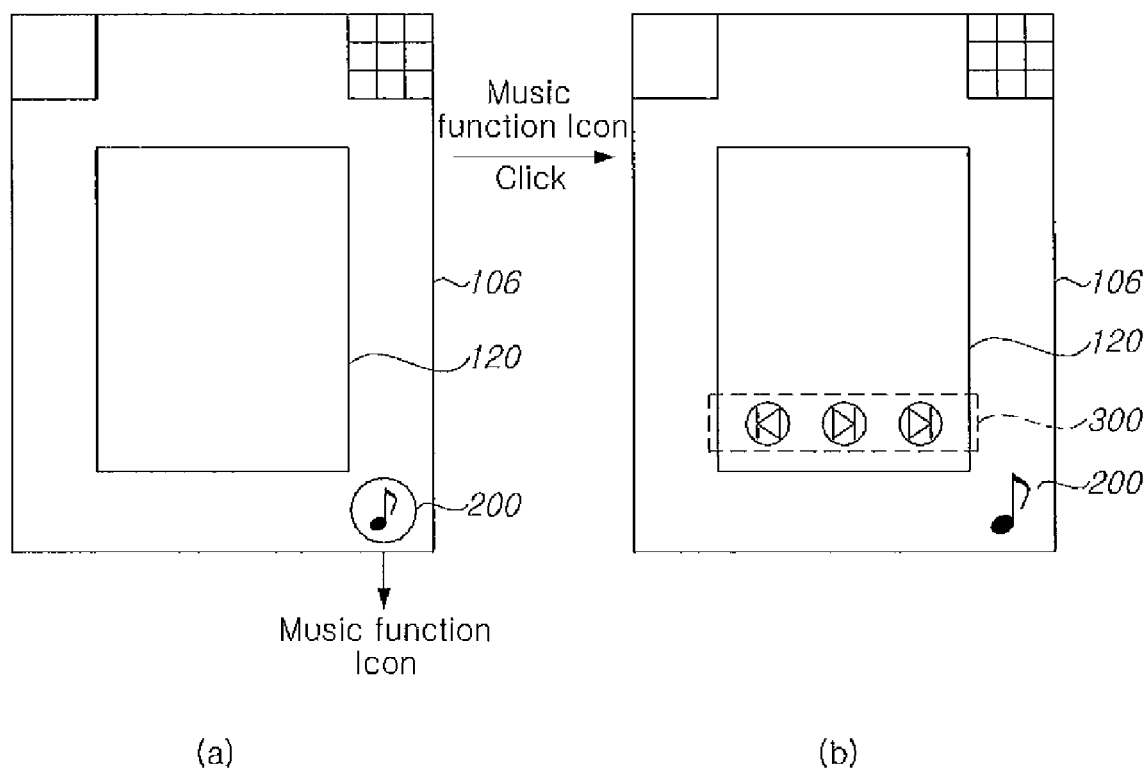
FIGS. 3(a) and 3(b) are overviews of display screens illustrating a music function being selected while a picture function or a text function is being executed on the terminal according to an embodiment of the present invention.

Then, as shown in FIGS. 3(*a*) and 3(*b*), when the user touches the menu function icon 200, the control unit 116 controls the display unit 106 to display control icons 300 for controlling operations related to the music function (e.g., play, rewind, skip, list music files, volume control, information about a particular music selection, etc.). Thus, when the user selects the music function icon 200 in FIG. 3(*a*) while the text or picture function 120 is currently executing, the user can then select one of the control icons 300 to listen to music while still viewing or working with the text or picture function 120. That is, the user can simultaneously perform multiple tasks on the terminal device 100 via a simplified touch input method.

In addition, in FIG. 3(*b*), the control unit 116 controls the display unit 106 to display the control icons 300 over the text or picture function 120 (e.g., in an overlapping transparent manner). However, the control icons 300 can be displayed at other portions of the display unit 106. In addition, as shown in FIG. 3(*a*), the user can enter commands related to the music function by touching corresponding control commands in the control icons 300.

Further, in one embodiment, the control unit 116 controls the controls icons 300 to fade away or disappear after a predetermined time, for example, since the user last touched the icons 300. The control unit 116 can also remove the control icons 300 if the user performs a predetermined input operation such as double touching the control icons 300, for example.

Figure 4:
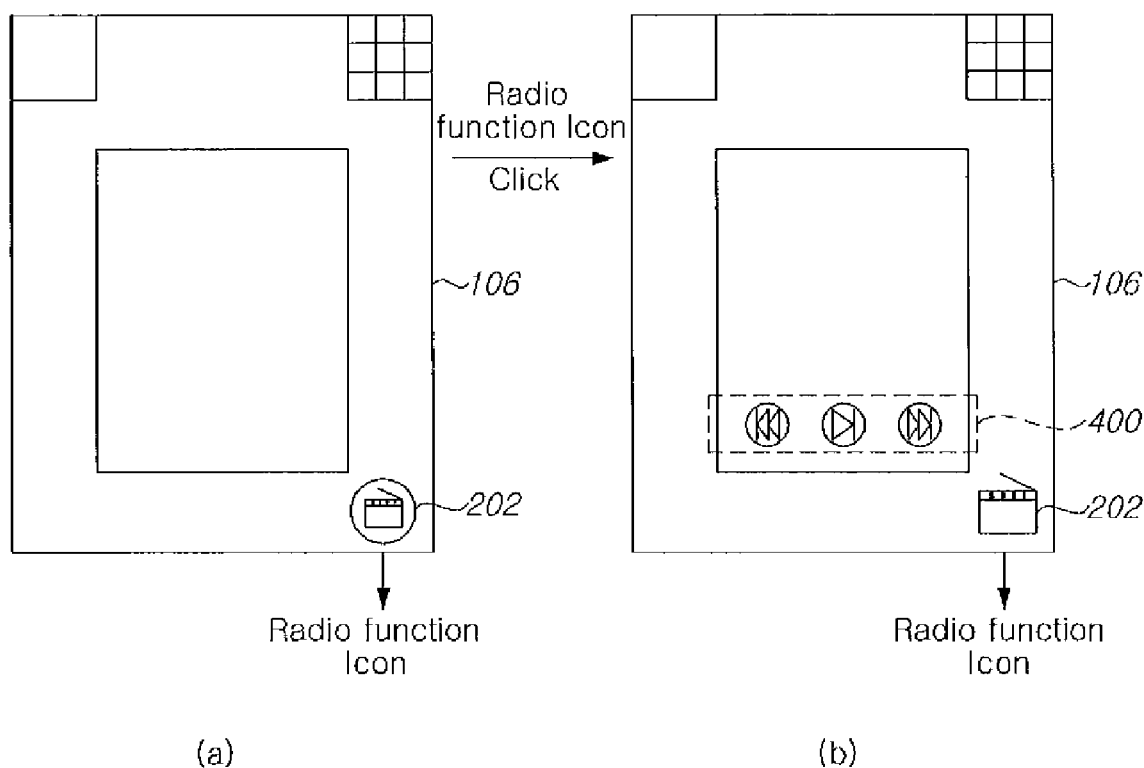
FIGS. 4(a) and 4(b) are overviews of display screens illustrating a radio function being selected while a picture function or a text function is being executed on the terminal according to an embodiment of the present invention.

FIGS. 4(*a*) and 4(*b*) are similar to FIGS. 3(*a*) and 3(*b*), but illustrate operations of the control unit 116 when the radio function icon 202 is manipulated by a user. In more detail, when the user touches the radio function icon 202 displayed near the right bottom of the display unit 106, the control unit 116 controls the display unit 106 to display radio control icons 400 for the radio function 400. A list of frequencies of radio broadcasts may also be displayed together on the display unit 106. Further, the control icons 400 can be commands for changing radio channels, switching between AM and FM channels, switching between AM/FM services and satellite radio services, turning on and off the power of the radio receiver, etc.

Figure 5:
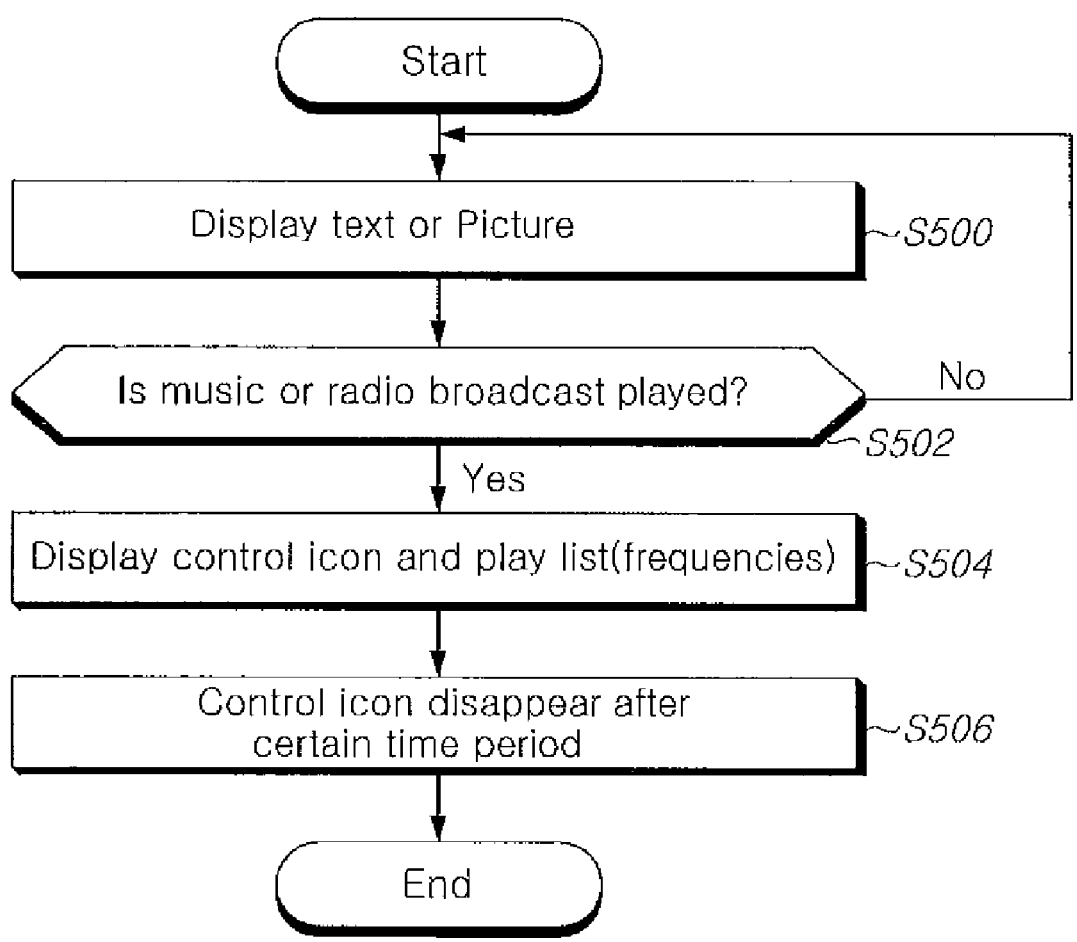
FIG. 5 is a flow chart illustrating a method of executing a second function while a first function is being executed on a terminal device according to an embodiment of the present invention.

Next, FIG. 5 is a flow chart illustrating a method of executing a second function while a first function is being executed on the terminal device according to an embodiment of the present invention. As shown in FIG. 5, the control unit 116 displays a first function (e.g., a picture function or a text function) on the display unit 106 (S500). As shown in FIGS. 2 and 3, the control unit 116 also displays the music function icon 200 or the radio function 202. In addition, the control unit 116 can automatically display the icons 200 and 202 when the user first executes the first function or a predetermined time after the first function starts. The control unit 116 can also display both of the icons 200 and 202 such that the user can see both icons without having to toggle between the two icons 200 and 202.

As shown in FIG. 5, the control unit 116 monitors the state of the touch screen 110 to determine if the user touches one of the music function icon 200 of the radio function icon 202 (S502). When the user does touch one of the icons 200 and 202 (Yes in S502), the control unit 116 controls the display unit 106 to display the appropriate control icons 300 or 400 (S504). As discussed above, the control function icons can be for listing available music, adjusting a volume, displaying information about a currently playing program, displaying a list of radio broadcast frequencies, changing between FM and AM, etc.

That is, when the user selects the music function icon 200, the control unit 116 controls the display unit 106 to display the control icons 300 for the music function so that the user can choose a music file from a displayed music list and play the music. Also, when the user selects the radio function icon 202, the control unit 116 controls the display unit 106 to display the control icons 400 for the radio function so that the user can choose a particular radio frequency and listen to the chosen radio broadcast. In addition, in the embodiment shown in FIG. 5, after the user-selected music file begins to play, the control unit 116 makes the control icons disappear after a predetermined time, for example (S506).

Figure 6:
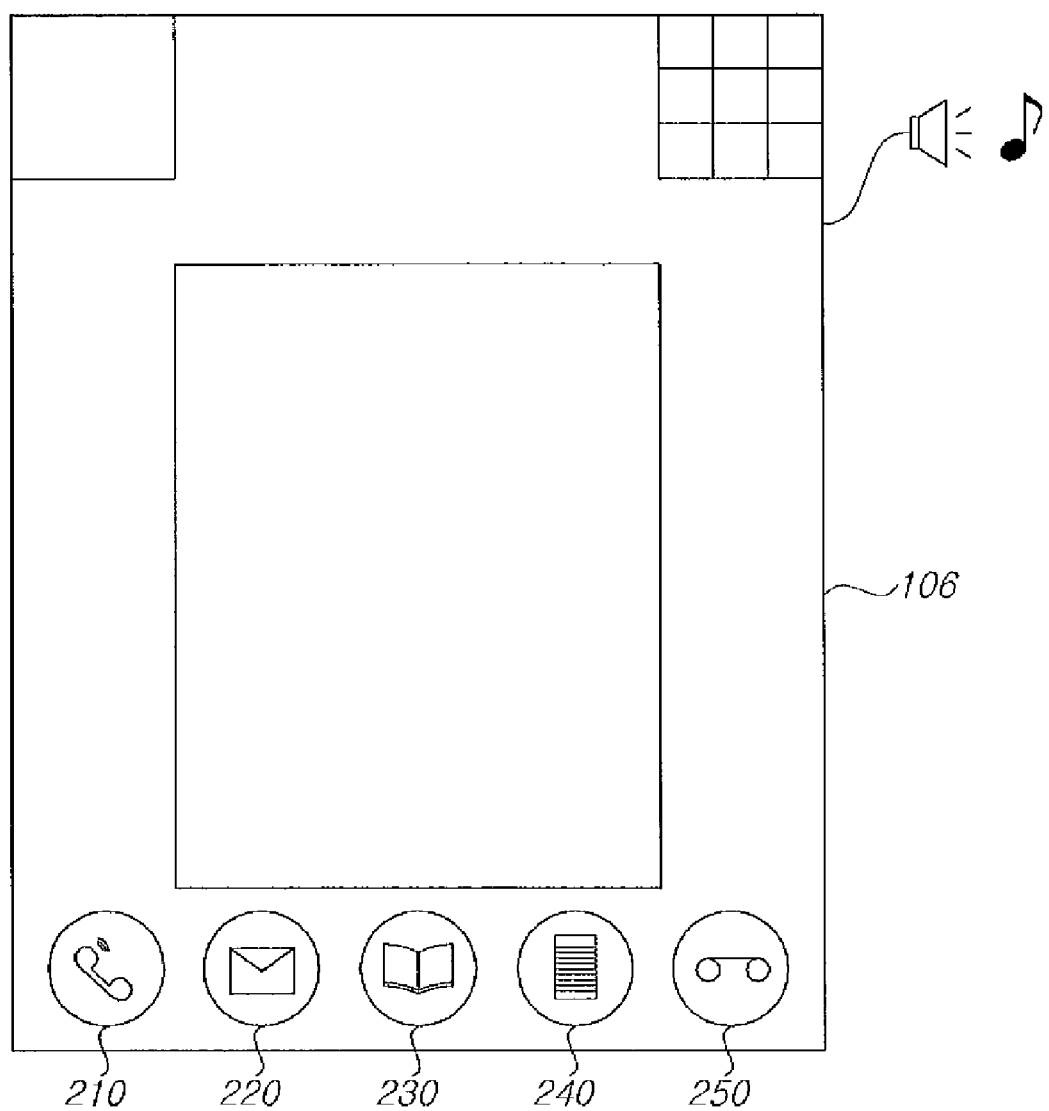
FIG. 6 is an overview of a display screen illustrating display multiple functions while another function is executing on the terminal according to an embodiment of the present invention.

Next, FIG. 6 is an overview of a display screen including multiple function icons being displayed while another function is currently being executed. That is, FIG. 6 illustrates an embodiment in which a first function is being executed, and a plurality of function icons of other second functions are displayed.

In FIG. 6, the first function is an audio function in which the user is listening to music. Thus, in this embodiment, the control unit 116 controls the display unit 106 to display icons related to functions other than the audio function. In particular, the control unit 116 controls the display unit 106 to display a message function icon 220, a phone number listing function icon 230, a memo function icon 240, and a recording function icon 250. Thus, while the user is listening to music via the music function, the user can select one of the displayed icons 220-250 to perform a corresponding function while simultaneously listening to music. That is, the functions corresponding to the icons 220-250 do not interfere with the music function.

In addition, the control unit 116 can also control the display unit 106 to display a call function icon 210 while the music function is executing. However, because the call function can not be executed together with the music function, the control unit 116 prompts or informs the user when a call request is received. The control unit 116 can then pause the first function to allow the call function depending on a state of the terminal, user input, etc.

Figure 7:
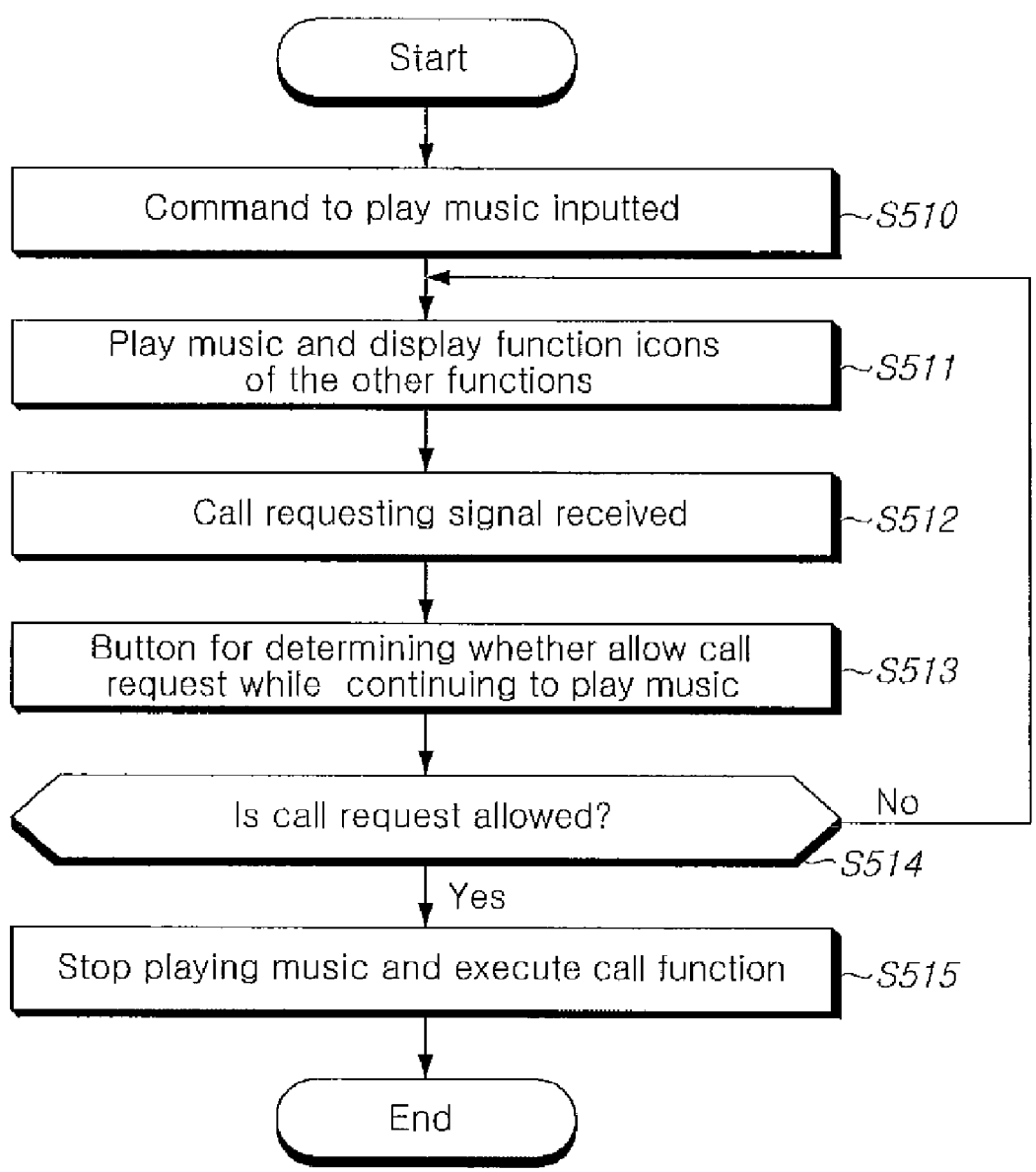
FIG. 7 is a flow chart illustrating a process of controlling a multi-task operation according to an embodiment of the present invention.
Figure 8:
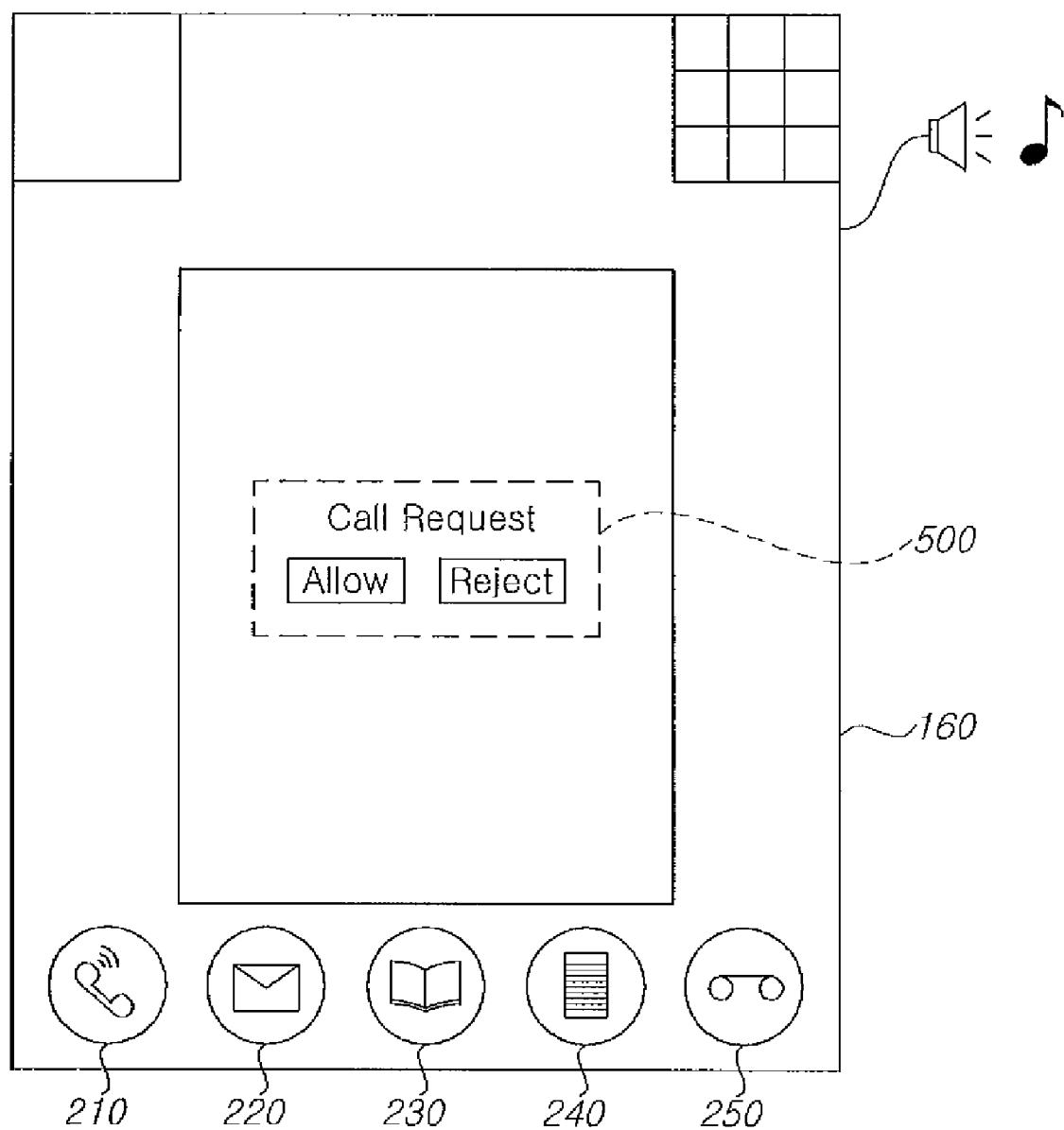
FIG. 8 is an overview of a display screen illustrating a method of notifying a user a call request has been received according to an embodiment of the present invention.

Further, FIG. 7 is a flow chart illustrating a method of controlling a multi-task operation according to another embodiment of the present invention. This embodiment assumes the user is listening to music. In particular, when the user inputs an instruction to play music (S510), the control unit 116 executes the music function and displays at least one function icon that the user can select to simultaneously execute a second function (S511). FIG. 6 illustrates an example of the control unit 116 displaying function icons 210-250. In addition, if the control unit 116 determines an external call request is received (S512), the control unit 116 controls the display unit 106 to display information 500 (FIG. 8) for determining whether the user wants to allow the call request while the first function is being continuously executed (S513). In FIG. 8, the information 500 includes a pop-window having soft buttons that the user can touch to allow or reject the call request while the user is simultaneously listening to the music.

However, the control unit 116 can notify the user about the reception of a call request in a number of different ways. For example, when the first function corresponds to outputting audio information, the control unit 116 can provide display information, and when the first function corresponds to outputting display information, the control unit 116 can output vibration or audio information to notify the user about the call request.

Then, as shown in FIG. 7, if the user does not allow the call request (No in S514), the control unit 116 continues to execute the first function, for example, the music function. That is, when the user does not allow the call request, the reception of the call request does not negatively influence to the music being played. Meanwhile, when the user accepts the call request (Yes in S514), the control unit 116 pauses the music function and executes the call request (S515). Accordingly, the music function is continuously executed until a call is connected. The control unit 116 can also restart the music playing function after the call has terminated.

Figure 9:
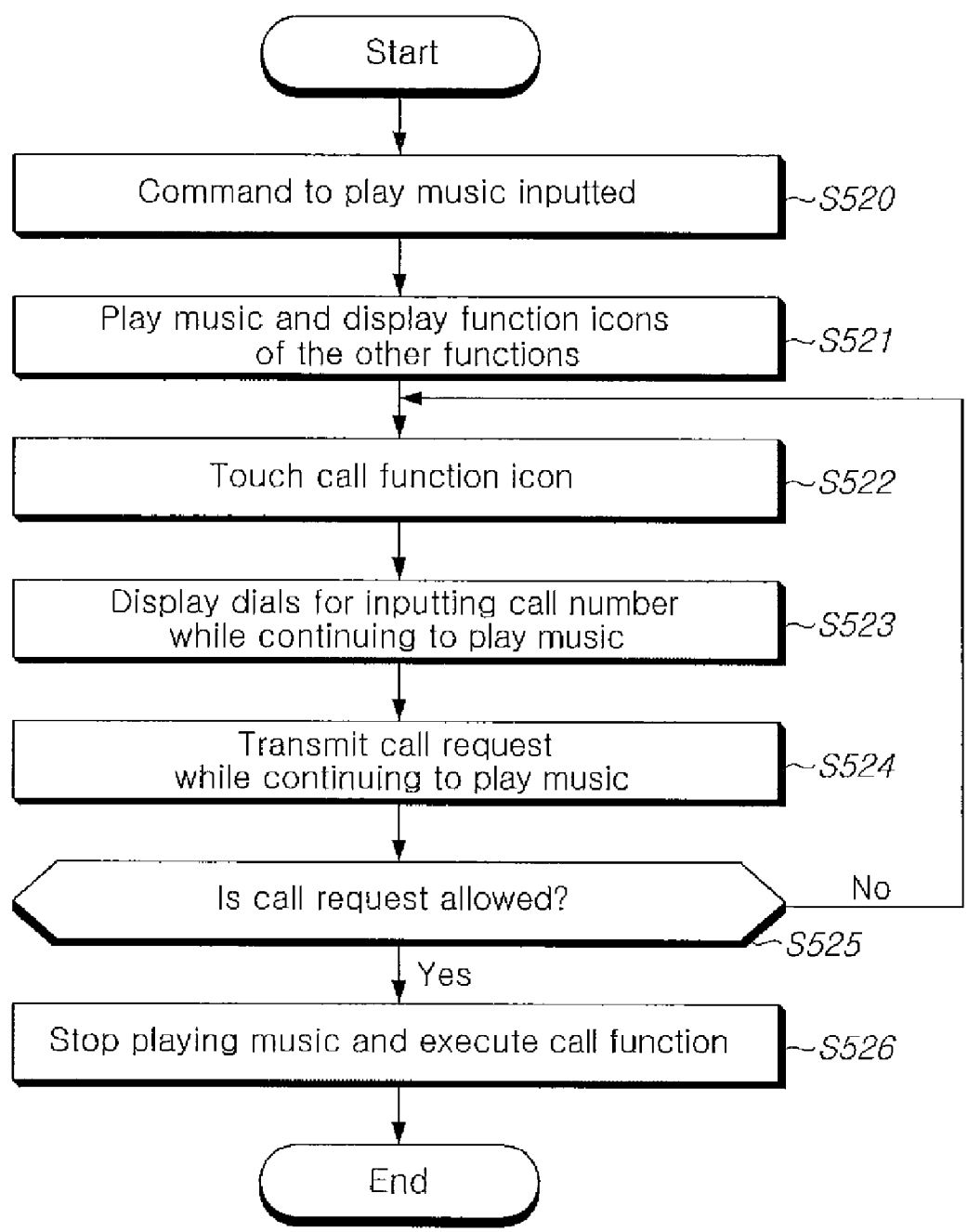
FIG. 9 is a flow chart illustrating a method of controlling a multi-task operation according to another embodiment of the present invention.

Next, FIG. 9 is a flow chart illustrating a method of controlling a multi-task operation according to another embodiment of the present invention. As shown in FIG. 9, the user first requests a music function to play music (S520), and the control unit 116 executes the music function and controls the display unit 106a music to display a plurality of function icons corresponding to other functions different than the music playing function (S521). FIG. 6 illustrates one example of the control unit 116 controlling the display unit 106 to display multiple function icons 210-250.

In FIG. 9, the user then selects the call function icon 210 to initiate a phone call (S522), and the control unit 116 controls the display unit 106 to display a keypad including soft keys for dialing a particular number (S523). The control unit 116 also continues to execute the first function (i.e., the music playing function) and transmits the call request (S524). The control unit 116 also determines whether the call request has been accepted at the other end while the first function is continuously being executed (S525). If the call request is accepted (Yes in S525), the control unit 116 pauses the first function (i.e., the music playing function in this example), and executes the call connection to the other terminal (S526).

Thus, in this embodiment, the control unit 116 determines whether the selected second function can be executed simultaneously with the first function, and paused the first function when the second function can not be executed simultaneously with the first function. Otherwise, the control unit 116 can simultaneously execute the first and second functions.

For example, when the user selects the message function icon 220 in FIG. 6 as the second function, the control unit 116 can execute both the first and second functions simultaneously, because the first function (i.e., music playing function) outputs audio information through the audio processing unit 108 (FIG. 1), and the second function (i.e., message function) uses the display unit 106. Thus, the control unit 116 can execute the two functions simultaneously, because the two functions do not interfere with each other. On the other hand, when the user selects the call function icon 210, which interferes with the first function (i.e., music playing function), the control unit 116 pauses the first function while the second function is executed.

Figure 10:
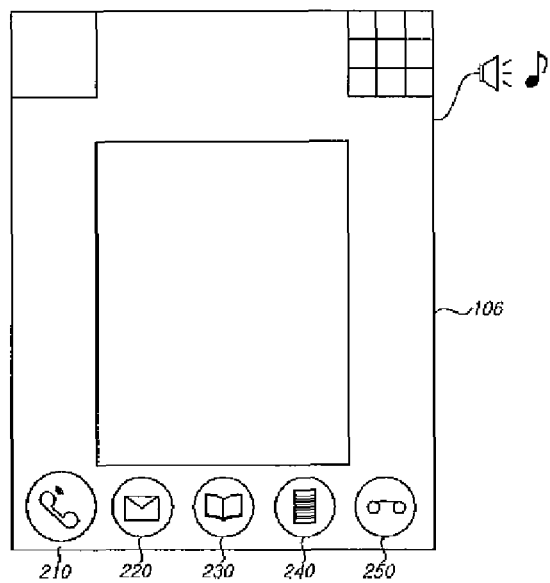
FIGS. 10(a) and 10(b) are overviews of display screens respectively illustrating the selection of a call function icon and a call dial pad according to an embodiment of the present invention.
Figure 10:
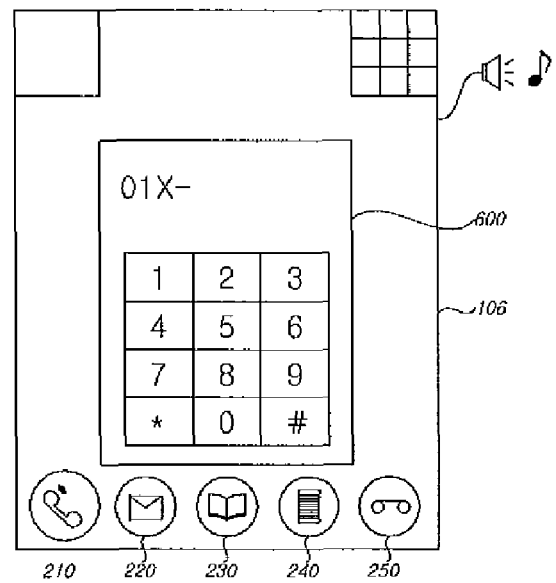

In addition, FIGS. 10(*a*) and 10(*b*) are overviews of display screens illustrating the selection of a call function icon and a call dial pad according to an embodiment of the present invention. As shown in FIG. 10(*a*), the user is listening to the music play function (first function) and selects the call function icon 210. Then, as shown in FIG. 10(*b*), the control unit 116 displays a dial pad 600 on the display unit 106 allowing the user to input a corresponding phone number. When the user inputs the phone number, the control unit 116 transmits the call request to the input phone number, while continuing to play the music. When the call request is accepted at the other end, the control unit 116 pauses the music playing function and connects the call request.

Thus, the present invention provides several advantages. For example, according to one embodiment of the present invention, the user can simultaneously perform multiple tasks on the terminal without having to use a back and forward key to traverse through several different functions on the terminal. Also, according to another embodiment of the present invention, the user can select a second function that is a different function than a currently executing function without being concerned about whether the two functions can be executed simultaneously, because the control unit 116 automatically determines whether the two functions can be executed simultaneously, and pauses one of the functions as appropriate. Also, according to another embodiment, the user can simultaneously execute multiple functions on the terminal using a simple one touch input operation.

In addition, various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments may also be implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

According to the above embodiments of the present invention, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example.

Further, the embodiments of the present invention are applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators. The terminal device 100 when a mobile terminal may also be implemented in a variety of different configurations. Examples of such configurations include folder-type, slide-type, bar-type, rotational-type, swing-type and combinations thereof.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

What is claimed is:

1. A method of controlling a mobile terminal, the method comprising:
   executing, via a controller of the mobile terminal, a first function on the mobile terminal, said first function outputting music through a speaker of the mobile terminal;
   simultaneously displaying, on a lower portion of a touch screen display of the mobile terminal, a plurality of selectable function icons for executing second functions that are different than the first function being executed;
   receiving a selecting signal indicating a call function icon among the selectable function icons displayed on the touch screen display has been selected;
   continuing to output the music through the speaker while simultaneously displaying a dialing keypad on the touch screen display for entering a calling number of another terminal identified by the calling number;
   receiving an input indicating the calling number has been entered by selecting keys on the dialing keypad;
   selecting a call function for calling said another terminal;
   pausing the first function not to output the music through the speaker; and calling said another terminal using the calling number.

2. The method of claim 1, further comprising:
   displaying at least one control icon for controlling the first function.

3. The method of claim 2, further comprising:
   removing the displayed at least one control icon if the at least one control icon is not selected for a predetermined amount of time or another function icon is selected.

4. The method of claim 1, further comprising:
   changing a function icon corresponding to said first function to another function icon for selecting another function that is different than the first function.

5. The method of claim 1, wherein the plurality of selectable function icons further comprises at least one of a radio broadcast function icon corresponding to a radio broadcast function, a picture function icon corresponding to a picture function, a text function icon corresponding to a text function, a motion picture function icon corresponding to motion picture function.

6. The method of claim 1, further comprising:
   receiving an incoming call request prior to selectively executing the second function simultaneously with the first function;
   displaying a prompt asking whether or not the incoming call request should be accepted;
   determining if the incoming call request will interrupt the first function; and
   pausing the executing of the first function and allowing the incoming call request be accepted when the determining step determines the incoming call request will interrupt the first function.

7. A mobile terminal, comprising:
   a wireless communication unit configured to wirelessly communicate with at least one other terminal;
   a touch screen display configured to simultaneously display on a lower portion of the touch screen display a plurality of selectable function icons for executing second functions that are different than a first function being executed, said first function outputting music through a speaker of the mobile terminal; and
   a controller configured to receive a selection signal indicating a call function icon among the selectable function icons has been selected, to continue to output the music through the speaker while simultaneously displaying a dialing keypad on the touch screen display for entering a calling number of another terminal identified by the calling number, to receive an input signal indicating the calling number has been entered using keys on the dialing keypad, to receive a call request signal for calling said another terminal, to pause the first function not to output the music through the speaker, and to call said another terminal using the calling number.

8. The device of claim 7, wherein the display unit is further configured to display at least one control icon for controlling the first function.

9. The device of claim 8, wherein the control unit is further configured to remove the displayed at least one control icon if the at least one control icon is not selected for a predetermined amount of time or another function icon is selected.

10. The device of claim 7, wherein the display unit is further configured to change a function icon corresponding to said first function to another function icon for selecting another function that is different than the first function.

11. The device of claim 7, wherein the plurality of selectable function icons further comprises at least one of a radio broadcast function icon corresponding to a radio broadcast function, a picture function icon corresponding to a picture function, a text function icon corresponding to a text function, and a motion picture function icon corresponding to motion picture function.

12. The mobile terminal of claim 7, further comprising:
a receiving unit configured to receive an incoming call request, wherein the display unit is further configured to display a prompt asking whether or not the incoming call request should be accepted, and wherein the controller is further configured to determine if the incoming call request will interrupt the first function, and to pause the executing of the first function and allow the incoming call request be accepted when the control unit determines the incoming call request will interrupt the first function.

13. The method of claim 1, wherein the plurality of selectable function icons are displayed in a row along a lower bottom portion of the touch screen display.

14. The method of claim 13, wherein the plurality of selectable function icons are displayed with a same equidistance between each selectable function icon.

15. The method of claim 13, wherein the plurality of selectable function icons displayed in the row are demarcated from the first function executing on the touch screen display.

16. The mobile terminal of claim 10, wherein the plurality of selectable function icons are displayed in a row along a lower bottom portion of the touch screen display.

17. The mobile terminal of claim 16, wherein the plurality of selectable function icons are displayed with a same equidistance between each selectable function icon.

18. The mobile terminal of claim 16, wherein the plurality of selectable function icons displayed in the row are demarcated from the first function executing on the touch screen display.

\* \* \* \* \*